(12) United States Patent
Schmidt et al.

(10) Patent No.: US 7,851,525 B2
(45) Date of Patent: Dec. 14, 2010

(54) HIGH TEMPERATURE VULCANIZED SILICONE RUBBER

(75) Inventors: Lars E. Schmidt, Zurich (CH); Alessandro Mattozzi, Stockholm (SE); Andrej Krivda, Wettingen (CH); Henrik Hillborg, Vaesteras (SE); Pitor Saj, Crakow (PL); Xavier Kornmann, Lauchringen (DE)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 12/651,812

(22) Filed: Jan. 4, 2010

(65) Prior Publication Data

US 2010/0105815 A1   Apr. 29, 2010

Related U.S. Application Data

(63) Continuation of application No. PCT/EP2008/057379, filed on Jun. 12, 2008.

(30) Foreign Application Priority Data

Jul. 4, 2007   (EP) .................................. 07111730

(51) Int. Cl.
*C08K 5/3492* (2006.01)
*C08K 3/10* (2006.01)
*C08K 3/22* (2006.01)
*C08K 3/36* (2006.01)

(52) U.S. Cl. ........................ 524/101; 524/400; 524/424; 524/430; 524/437; 524/493

(58) Field of Classification Search ................ 524/101, 524/400, 424, 430, 437, 493
See application file for complete search history.

(56) References Cited

U.S. PATENT DOCUMENTS 3,813,364 A   5/1974   DeZuba et al.

2005/0059754 A1 *   3/2005   Lunt et al. .................. 523/210
2006/0019105 A1   1/2006   Vick et al.

OTHER PUBLICATIONS

Han et al., "Effects of Alumina Trihydrate on the Electrical Insulation Properties of HTV Silicone Rubber", Proceedings of the 7th International Conference on Properties and Applications of Dielectric Materials, Jun. 1-5, 2003, pp. 381-384.
Kumagai et al., "Tracking and Erosion of HTV Silicone Rubber and Suppression Mechanism of ATH", IEEE Transaction on Dielectrics and Electrical Insulation, vol. 8, No. 2, Apr. 2001, pp. 203-211.
Kumagai et al., "Polydimethylsiloxane and Alumina Trihydrate System Subjected to Dray-band Discharges or High Temperature Part II: Electrical Insulation", IEEE Transactions on Dielectrics and Electrical Insulation, vol. 11, No. 4, Aug. 2004, pp. 701-707.
Kumagai wet al., "Polydimethylsiloxane and Alumina Trihydrate System Subjected to Dray-band Discharges or High Temperature Part I: Chemical Structure", IEEE Transactions on Dielectrics and Electrical Insulation, vol. 11, No. 4, Aug. 2004, pp. 691-700.
Krivda et al., "Chemical analysis of outdoor silicone materials after electrical and environmental testing", 4 pages.
International Search Report (PCT/ISA/210) dated Aug. 20, 2008.
Written Opinion of the International Search Authority (PCT/ISA/237) dated Aug. 20, 2008.
European Search Report (EPO Form 1507N) dated Dec. 3, 2007.

* cited by examiner

*Primary Examiner*—Kriellion A Sanders
(74) *Attorney, Agent, or Firm*—Buchanan Ingersoll & Rooney PC

(57) ABSTRACT

A high temperature vulcanized silicone rubber is disclosed and includes a high temperature vulcanized silicone rubber as a silicone base and melamine cyanurate as a filler and at least one inorganic filler which is different from melamine cyanurate, and optionally further additives. A total filler content can be within a range of 40 parts (by weight) to 230 parts (by weight) per 100 parts (by weight) of silicone base; wherein (i) the melamine cyanurate is present within a range of 2 parts (by weight) to 40 parts (by weight) per 100 parts (by weight) of silicone base; and (ii) the at least one inorganic filler is an electrical insulator.

26 Claims, No Drawings

HIGH TEMPERATURE VULCANIZED SILICONE RUBBER

RELATED APPLICATIONS

This application claims priority as a continuation application under 35 U.S.C. §120 to PCT/EP2008/057379, which was filed as an International Application on Jun. 12, 2008 designating the U.S., and which claims priority to European Application 07111730.3 filed in Europe on Jul. 4, 2007. The entire contents of these applications are hereby incorporated by reference in their entireties.

FIELD

The present disclosure refers to high temperature vulcanized silicone rubber (HTV-SR) having, for example, improved tracking and erosion resistance. Exemplary embodiments encompass a high temperature vulcanized polydimethylsiloxane (HTV-PDMS) with improved tracking and erosion resistance.

BACKGROUND INFORMATION

High temperature vulcanizing silicone rubber (HTV-SR), such as high temperature vulcanized polydimethylsiloxanes (HTV-PDMS), are widely used in the electrical engineering industry, such as for outdoor insulation, due to their surface properties and the capability to recover hydrophobicity.

However, in outdoor and wet environment often erosion, patterns are observed on the rubber surface, whereby the electrical conductivity within the pattern can be considerably increased due to discharge degradation. The electrically conductive path has been referenced as a track, or as tracking. Tracks reduce the insulation strength and may lead to flashover or dielectric breakdown.

As a result, tracking-resistant polymer systems have been developed for the use as outdoor high-voltage insulation. One example is high temperature vulcanized polydimethylsiloxane (HTV-PDMS) filled with alumina trihydrate [(ATH), ($Al_2O_3 \cdot 3H_2O$)] containing, for example, about 30 to 70% by weight of ATH, calculated to the total weight of the insulation material [or 43 parts (phr) to 230 parts (phr) of ATH per 100 part of SR]. Such a material has been used to produce outdoor high-voltage insulation systems. Aluminium hydroxide [$Al(OH)_3$] has been referred to as alumina trihydrate (ATH) because chemically ($Al_2O_3 \cdot 3H_2O$) corresponds to $2[Al(OH)_3]$ but the term "ATH" has been used in the field of polymeric outdoor insulation.

Testing the tracking resistance of various commercial high temperature vulcanized silicone rubber (HTV-SR) and various commercial high temperature vulcanized polydimethylsiloxane (HTV-PDMS) according to IEC (International Electrotechnical Commission) standard 60587 at 4.5 kV revealed that these materials can fail during testing, showing deep erosion and a layer-wise degradation, resulting in a dielectric breakdown in the IEC 60587 tracking test. The degradation mechanism was found to be complicated, as temperatures of above 1200° C. (>1200° C.) and even higher than 1600° C. (>1600° C.) may arise during surface discharge. Therefore, the tracking and erosion resistance of filler containing HTV-SR can be further addressed.

SUMMARY

A high temperature vulcanized silicone rubber is disclosed comprising: a silicone base of high temperature vulcanized silicone rubber; a filler of melamine cyanurate; and at least one inorganic filler which is different from melamine cyanurate, wherein total filler content is within a range of 40 parts (by weight) to 230 parts (by weight) per 100 parts (by weight) of silicone base; and wherein (i) the melamine cyanurate is present within a range of 2 parts (by weight) to 40 parts (by weight) per 100 parts (by weight) of silicone base; and (ii) the at least one inorganic filler is an electrical insulator.

A hardenable silicone rubber resin is disclosed, comprising: a hardenable silicone rubber as a silicone base having a mixture of compounds of formula (I):

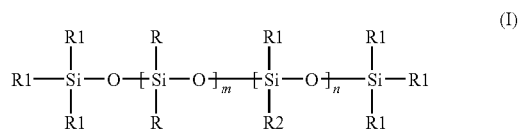

(I)

melamine cyanurate as a filler; and at least one inorganic filler which is different from melamine cyanurate, wherein a total filler content is within a range of 40 parts (by weight) to 230 parts (by weight) per 100 parts (by weight) of silicone base; and wherein (i) the melamine cyanurate is present within a range of 2 parts (by weight) to 40 parts (by weight) per 100 parts (by weight) of silicone base; and (ii) the at least one inorganic filler is an electrical insulator.

DETAILED DESCRIPTION

It has been found that HTV-SR and especially HTV-PMDS can show an improved tracking and erosion resistance without loss of mechanical properties when high temperature vulcanized silicone rubber (HTV-SR) includes a high temperature vulcanized silicone rubber (HTV-SR) as a silicone base and melamine cyanurate as a filler material.

A high temperature vulcanized silicone rubber (HTV-SR) is therefore disclosed which can possess an improved tracking and erosion resistance. An exemplary high temperature vulcanized silicone rubber includes a high temperature vulcanized silicone rubber as a silicone base and melamine cyanurate as a filler and at least one inorganic filler which is different from melamine cyanurate, and optionally includes further additives; wherein a total filler content is within a range of 40 parts (by weight) to 230 parts (by weight) per 100 parts (by weight) of silicone base. In exemplary embodiments:

(i) the melamine cyanurate is present within a range of 2 parts (by weight) to 40 parts (by weight) per 100 parts (by weight) of silicone base; and (ii) the at least one inorganic filler which is different from melamine cyanurate, is selected from known inorganic fillers used in the field of electrical insulations.

The total filler content can, for example, be within a range of 65 parts (by weight) to 150 parts (by weight) per 100 parts (by weight) of silicone base.

The melamine cyanurate is, for example, within a range of 3 parts (by weight) to 30 parts (by weight) per 100 parts (by weight) of silicone base, preferably within a range of 5 parts (by weight) to 20 parts (by weight) per 100 parts (by weight) of silicone base, preferably within a range of 10 parts (by weight) to 20 parts (by weight) per 100 parts (by weight) of silicone base.

The high temperature vulcanized silicone rubber (HTV-SR) can be a high temperature vulcanized polydimethylsiloxane (HTV-PDMS). High temperature vulcanized silicone rubbers (HTV-SR) can be composed of cross-linked groups of [—(R₁R₂)Si—O—], [—(R₁)Si(—O—)₂] with terminating groups [(R₁R₂R₃)Si—O—], wherein R₁, R₂ and R₃ are optionally substituted methyl or phenyl, preferably methyl or phenyl, preferably methyl. The bridging [≡Si—O—Si≡]- group can be replaced by a group of the formula [≡S₁—CH₂—CH₂—Si≡] or [≡Si—CH₂—CH₂—CH₂—Si≡], depending on the cross-linking mechanism and/or the starting materials chosen. Such high temperature vulcanized silicone rubbers (HTV-SR) and high temperature vulcanized polydimethylsiloxanes (HTV-PDMS) as used in the production of electrical isolation systems are known to those skilled in the art, and need no further detailed description.

The at least one inorganic filler which is different from melamine cyanurate can, for example, be selected from known inorganic fillers used in the field of electrical insulations and is, for example, preferably selected from the group comprising (e.g., consisting of) alumina trihydrate (ATH) and silica. Each filler may be used alone or as a mixture with each other or another inorganic filler. If ATH and silica are used together as a mixture, then the ratio of ATH:silica is, for example, 5:95 to 25:75, and preferably 15:85 to 25:75, and the content of melamine cyanurate is, for example, within the range of 10% to 40% by weight, calculated to a sum of ATH and silica, preferably within a range of 15% to 30% by weight calculated to the sum of ATH and silica.

If the filler material comprises (e.g., consists of) melamine cyanurate and silica, then the ratio of melamine cyanurate:silica is for example 40:60 to 2:98, preferably 30:70 to 5:95, and preferably 20:80 to 5:95 and a content of the optional ATH is, for example, up to 10% by weight, preferably up to 5% by weight, calculated to a sum of silica and melamine cyanurate. The filler material does not, for example, contain any ATH.

Alumina trihydrate corresponds to the chemical formula [Al₂O₃.3H₂O], silica to [SiO₂] as mentioned above. Melamine cyanurate is defined as [CAS-No. 37640-57-6].

Average grain sizes and specific surface areas (BET) of the filler material as used in the present disclosure are known in the art. Such filler material is commercially available. The filler material may be surface treated (e.g., surface modified) in any manner known per se, for example with silazanes, such as hexamethylsilazane or divinyltetramethyldisilazane or with vinylalkoxysilanes, such as vinyltrimethoxysilan, or for example with alkoxysilanes or siloxandiols.

Further known optional additives such as, for example inhibitors (e.g., stabilizers, flame retardants) or colors and pigments can be included.

An exemplary high temperature vulcanized silicone rubber (HTV-SR) according to the present disclosure can be made from a hardenable liquid or pasteous silicone resin composition. A hardenable liquid or pasteous silicone resin composition can be a mixture of organopolysiloxanes, such as a mixture of compounds of the formula (I):

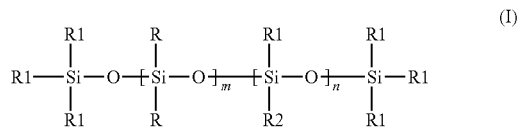

wherein
R (each independent of one other) is $(C_{1-4})$-alkyl which optionally is substituted by chlorine and/or bromine or phenyl; preferably methyl, ethyl, propyl, 3,3,3-trifluoropropyl, monofluoromethyl, oder difluoromethyl; preferably methyl;

R₁ (each independent of one other) has one of the meanings of R or R₂, or is —O-Alkyl($C_1$-$C_4$) or hydroxyl;

R₂ (each independent of one other) has one of the meaning of R, or is hydrogen, or a residue of the formula: -(A)ᵣ-CH=CH₂;

A is a residue —$C_sH_{2s}$—, preferably —$(CH_2)_s$—, wherein s is a whole number from 1 to 3, preferably 1;

r is zero or one;

m is a number within the range of 500 to 20'000, preferably within the range of 1000 to 15'000, most preferably within the range of 4'000 to 10'000;

n is a number within the range of zero to 500, preferably zero or within the range of 2 to 100, most preferably zero or a number within the range of 2 to 20; and wherein the groups —[Si(R)(R)O]— und —[Si(R₁)(R₂)O]— are ordered in an arbitrary sequence.

R₂ can have one of the meanings given for R, wherein R is, for example, methyl or phenyl, wherein the molecule contains methyl as well as phenyl residues. The ratio of methyl to phenyl is given by the desired flowability of the mixture and the properties desired in the hardened product. R is, for example, methyl. The compound of formula (I) can be is a mixture of homologous compounds of formula (I) which is known to those skilled in the art. At least a part of the substituents R₁ can have the meaning of —O-Alkyl($C_1$-$C_4$) or hydroxyl or of -(A)ᵣ-CH=CH₂.

The exemplary mixture of silicone compounds can be hardened by adding a trialkoxysilane of the formula [($C_{1-4}$)Alkyl]₄₋ₓSi[O-Alkyl($C_{1-4}$)]ₓ, wherein x is, for example, 1 to 4, preferably 1, 2 or 3, more preferably 3; for example methyltrimethoxysilane, methyltriethoxysilane and similar compounds; compounds of the formula [($C_2$-$C_4$)Alkenyl]₄₋ₓSi[O-Alkyl($C_1$-$C_4$)]ₓ, wherein x is, for example, 1 to 4, preferably 1, 2 or 3, more preferably 3, such as vinyltrimethoxysilane or allyltrimethoxysilane, (phenyl)Si[O-alkyl($C_1$-$C_4$)]; or a silane of the formula [($C_1$-$C_4$)Alkyl]SiH₃ or similar low molecular hydrogensiloxanes. It is also possible to use peroxide compounds, such as diacylperoxide, dialkylperoxide and other peroxides known per se to harden the siloxane mixture. Elevated temperatures can be used for the hardening process, which yield a high temperature vulcanized silicone rubber (HTV-SR).

In an exemplary embodiment of the present disclosure, R₂ is hydrogen as well as -A-CH=CH₂, wherein R₂ per molecule represents, for example, hydrogen only or -A-CH=CH₂ only. The compound wherein R₂ is hydrogen and the compound wherein R₂ is -A-CH=CH₂, can be stored separately to avoid any interaction. The compounds can be mixed shortly before hardening the mixture. Both compounds can be mixed in equimolar amounts and then hardened (e.g., vulcanized). A molar excess of about 2 to 5% of the Si—H-groups can be used with respect to the component containing the -A-CH=CH₂ substituent. Further a catalyst can, for example, be used, such as a complex made from a metal selected from rhodium, nickel, palladium and/or platin, in an amount of, for example, 1 to 100 ppm calculated to the metal bound in the complex. Such catalytically active compounds and the silicon compounds of formula (I) are known per se and have been described in literature.

The filler composition optionally includes further fillers which may partially or wholly replace the inorganic filler which is different from melamine cyanurate. Such filler may be selected from the group comprising (e.g., consisting of)

glass powder, metal oxides such magnesium oxide, titanium oxide; metal nitrides, such as silicon nitride, boron nitride and aluminium nitride; metal carbides, such as silicon carbide; ground natural and synthetic minerals mainly silicates, such as talcum, glimmer, kaolin, wollastonite, bentonite; calcium silicates such as xonolit $[Ca_2Si_6O_{17}(OH)_2]$; aluminium silicates such as andalusite $[Al_2O_3.SiO_2]$ or zeolithe; Aluminumoxide $[Al_2O_3]$; and known calcium/magnesium silicates, in different powder sizes. Exemplary fillers are aluminum trihydrate and silicon dioxide as described herein above.

The present disclosure refers also to a hardenable silicone rubber resin, wherein the hardenable silicone rubber includes a hardenable silicone rubber as a silicone base comprising, for example, a mixture of compounds of formula (I), melamine cyanurate as a filler and at least one inorganic filler which is different from melamine cyanurate, and optionally further additives; wherein the total filler content is within a range of 40 parts (by weight) to 230 parts (by weight) per 100 parts (by weight) of silicone base; and wherein
(i) the melamine cyanurate is present within the range of 2 parts (by weight) to 40 parts (by weight) per 100 parts (by weight) of silicone base; and
(ii) the at least one inorganic filler which is different from melamine cyanurate is selected from known inorganic fillers used in the field of electrical insulations. For the given values, exemplary values as already described herein are also valid.

The present disclosure also encompasses an exemplary hardenable silicone rubber resin, containing a mixture of compounds of formula (I) in the form of a two-component system, wherein one component contains a mixture of compounds of formula (I) wherein $R_2$ is hydrogen and the other component contains a mixture of compounds of formula (I) wherein $R_2$ is $-A-CH=CH_2$; as defined above; the resin being hardenable after mixing of the two components and after addition of a catalyst as defined above.

The present disclosure also encompasses exemplary methods of making high temperature vulcanized silicone rubber with improved tracking and erosion resistance according to the present disclosure. Components of the hardenable mixture (i.e., silicone compounds of formula (I), the filler material as defined above, the catalyst as defined above, and any optional additives) are mixed in any desired sequence and are heated to an exemplary temperature within the range of, for example, 100° C. to 150° C., preferably within the range of 120° C. to 140° C., for a time long enough to cause complete vulcanization of the composition.

The present disclosure also encompasses methods wherein shaped articles are produced using the hardenable silicone rubber resin, as defined above (e.g., for production of shaped articles in the field of electrical isolators, such as in the field of high voltage isolators, for outdoor use).

The present disclosure also encompasses shaped articles used, for example, in the field of electrical isolators, specifically in the field of high voltage isolators, such as for outdoor use and made in a manner as described herein.

The following examples illustrate aspects of the disclosure without restricting the scope of the description and claims.
Examples The components as give in Table 1 are dispersed in the silicone base by either using a duplex kneader, a two-roll mill or a combination of both. The homogeneous formulation is then molded and cured at an elevated temperature, chosen on the basis of the peroxide or platinum compound. After remolding, a post-curing step is possible, but not necessary. For the described examples curing was carried out for 30 minutes at 130° C. and post-curing for 4 hours at 150° C.

Table 1 shows an exemplary Formulation A and compares this Formulation A with two commercial References 1 and 2. Table 2 lists their properties. Composition of proposed formulations (i.e. filler, additive and curing agent content) is given in phr (parts per hundred) with respect to the silicone base.

TABLE 1

|  | Formulation A | Reference 1 | Reference 2 |
|---|---|---|---|
| Silicone | silicone base | silicone base | silicone base |
| Filler 1 | 100 phr silica | 75 phr ATH | 100 phr silica |
| Filler 2 | 15 phr melamine cyanurate | 25 phr silica | —.— |
| Curing Agent | 2 phr peroxide | 2 phr peroxide | 2 phr peroxide |

Silicone base (a peroxide cured silicone rubber, Elastosil R 401/70 OH, Wacker Chemie GmbH, DE)
ATH (aluminiumtrihydrate, Martinal OL-104/S, Martinswerk GmbH, DE)
Silica (e.g. quarz flour W12MST, Quarzwerke, DE)
Melamine Cyanurate (e.g. Budit 314, Budenheim Iberica Comercial, S.A., ES)
Peroxide (DCLBP-50-PSI: Di(2,4-dichlorobenzoyl)peroxide, 50%, in silicone oil, Degussa Initiators GmbH & Co. KG, DE)

Formulations containing the above mentioned components were compared to the Reference, which is the commercially available HTV silicone rubber Dow Corning HV 1660/65.

TABLE 2

Properties of the formulations according to Table 1

|  | Standard | Formulation A | Reference 1 | Reference 2 |
|---|---|---|---|---|
| Flammability | IEC 60695-11-10 | flameproof (class VO) | flameproof (class VO) | not flameproof |
| Tracking Resistance | IEC 60587 | pass 4.5 and 6 kV | fail 4.5 and 6 kV | fail 4.5 and 6 kV |
| Tensile Strength (MPa) | ISO 37 | 6.0 | 6.1 | 7.7 |
| Elongation at Break (%) | ISO 37 | 136 | 112 | 133 |

Comparison between formulation A and the Reference 1:

The introduction of melamine cyanurate and removal of ATH can lead to an improvement of the tracking resistance without deteriorating mechanical properties or flame retardancy. Furthermore the cost of the material can be reduced by 20%.

Comparison between formulation A and the Reference 2:

The introduction of melamine cyanurate can lead to an improvement of the tracking resistance and flame retardancy without deteriorating mechanical properties.

Analogous results can be obtained when silica (100 phr silica) in Formulation A is replaced by, for example, a mixture of silica and ATH in a weight ration of silica:ATH=80:20.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A high temperature vulcanized silicone rubber comprising:
   a silicone base of high temperature vulcanized silicone rubber;
   a filler of melamine cyanurate; and at least one inorganic filler which is different from melamine cyanurate, wherein total filler content is within a range of 40 parts (by weight) to 230 parts (by weight) per 100 parts (by weight) of silicone base; and wherein (i) the melamine cyanurate is present within a range of 2 parts (by weight) to 40 parts (by weight) per 100 parts (by weight) of silicone base; and (ii) the at least one inorganic filler which is different from melamine cyanurate is selected from inorganic fillers known to be used in the field of electrical insulations.

2. A high temperature vulcanized silicone rubber according to claim 1, wherein the total filler content is within a range of 65 parts (by weight) to 150 parts (by weight) per 100 parts (by weight) of silicone base.

3. A high temperature vulcanized silicone rubber according to claim 1, wherein the melamine cyanurate is present within a range of 3 parts (by weight) to 30 parts (by weight) per 100 parts (by weight) of silicone base.

4. A high temperature vulcanized silicone rubber according to claim 1, formed as a high temperature vulcanized polydimethylsiloxane composed of cross-linked groups of [—($R_1R_2$)Si—O—], [—($R_1$)Si(—O—)$_2$] with terminating groups [($R_1R_2R_3$)Si—O—], wherein $R_1$, $R_2$ and $R_3$ include at least one of methyl and phenyl.

5. A high temperature vulcanized silicone rubber according to claim 4, comprising:
a bridging group of a formula [≡Si—$CH_2$—$CH_2$—Si≡] or [≡Si—$CH_2$—$CH_2$—$CH_2$—Si≡].

6. A high temperature vulcanized silicone rubber according to claim 1, wherein the at least one inorganic filler is selected from the group consisting of: alumina trihydrate (ATH) and silica.

7. A high temperature vulcanized silicone rubber according to claim 6, wherein ATH and silica are used together; a ratio of ATH:silica is 5:95 to 25:75; and the content of melamine cyanurate is within a range of 10% to 40% by weight, calculated to a sum of the ATH and silica.

8. A high temperature vulcanized silicone rubber according to claim 1, wherein the inorganic filler comprises:
melamine cyanurate and silica, with a ratio of melamine cyanurate:silica being 40:60 to 2:98; and
ATH up to 10% by weight, calculated to a sum of silica and melamine cyanurate.

9. A high temperature vulcanized silicone rubber according to claim 1, wherein the inorganic filler is surface treated, with at least one of:
silazanes, vinylalkoxysilanes, alkoxysilanes and siloxandiols.

10. A high temperature vulcanized silicone rubber according to claim 1, comprising:
additives selected from the group consisting of stabilizers, flame retardants, colors and pigments.

11. A high temperature vulcanized silicone rubber according to claim 1, comprising:
a hardenable liquid or pasteous silicone resin base composition formed as a mixture of organopolysiloxanes of the general formula:

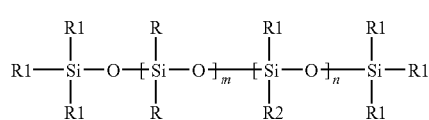

(I)

wherein

R (each independent of one other) is ($C_{1-4}$-alkyl, chlorine and/or bromine or phenyl;

$R_1$ (each independent of one other) is R or $R_2$, or is —O-Alkyl($C_1$-$C_4$) or hydroxyl;

$R_2$ (each independent of one other) is R, or is hydrogen, or a residue of the formula: -(A)$_r$-CH=$CH_2$;

A is a residue —$C_sH_{2s}$—, wherein s is a whole number from 1 to 3;

r is zero or one;

m is a number within a range of 500 to 20'000;

n is a number within a range of zero to 500; and wherein the groups —[Si(R)(R)O]— and —[Si($R_1$)($R_2$)O]— are ordered in an arbitrary sequence.

12. A high temperature vulcanized silicone rubber according to claim 11, wherein $R_2$ is R, wherein R is methyl or phenyl.

13. A high temperature vulcanized silicone rubber according to claim 1, wherein the inorganic filler comprises:
a further filler which at least partially replaces the at least one inorganic filler, and is selected from the group consisting of:
glass powder, metal oxides, metal nitrides, metal carbides, ground natural and synthetic minerals, and calcium silicates.

14. A hardenable silicone rubber resin, comprising:
a hardenable silicone rubber as a silicone base having a mixture of compounds of formula (I):

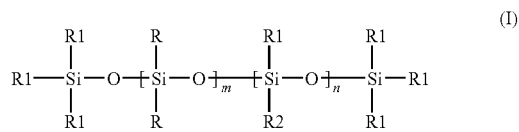

(I)

melamine cyanurate as a filler; and at least one inorganic filler which is different from melamine cyanurate, wherein a total filler content is within a range of 40 parts (by weight) to 230 parts (by weight) per 100 parts (by weight) of silicone base; and wherein (i) the melamine cyanurate is present within a range of 2 parts (by weight) to 40 parts (by weight) per 100 parts (by weight) of silicone base; and (ii) the at least one inorganic filler which is different from melamine cyanurate is selected from inorganic fillers known to be used in the field of electrical insulations.

15. A hardenable silicone rubber resin according to claim 14, wherein the mixture of compounds of formula (I) is formed as a two-component system, comprising:
one component containing a mixture of compounds of formula (I), wherein $R_2$ is hydrogen; and
another component containing a mixture of compounds of formula (I) wherein $R_2$ is A-CH=$CH_2$;

wherein

R (each independent of one other) is ($C_{1-4}$)-alkyl, chlorine and/or bromine or phenyl;

$R_1$ (each independent of one other) is R or $R_2$, or is —O-Alkyl($C_1$-$C_4$) or hydroxyl;

$R_2$ (each independent of one other) is R, or is hydrogen, or a residue of the formula: -(A)$_r$-CH=$CH_2$;

A is a residue —$C_sH_{2s}$—, wherein s is a whole number from 1 to 3;

r is zero or one;

m is a number within a range of 500 to 20'000;

n is a number within a range of zero to 500; and
wherein the groups —[Si(R)(R)O]— and —[Si($R_1$)($R_2$)O]— are ordered in an arbitrary sequence;
said resin being hardenable after mixing of the two components and after addition of a catalyst.

16. A method for making a high temperature vulcanized silicone rubber, comprising:
mixing a composition of a hardenable silicone rubber as a silicone base having a mixture of compounds of formula (I):

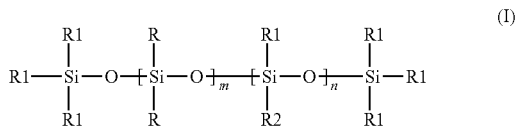

melamine cyanurate as a filler; and
at least one inorganic filler which is different from melamine cyanurate;
wherein a total filler content is within a range of 40 parts (by weight) to 230 parts (by weight) per 100 parts (by weight) of silicone base; and wherein
(i) the melamine cyanurate is present within a range of 2 parts (by weight) to 40 parts (by weight) per 100 parts (by weight) of silicone base; and
(ii) the at least one inorganic filler is an electrical insulator; and
heating the mixed composition to a temperature within a range of 100° C. to 150° C. for a time long enough to cause complete vulcanization of the composition.

17. The method according to claim 16, comprising:
producing shaped articles in a field of electrical isolators.

18. A shaped article in a field of electrical isolators, formed of a silicone rubber insulation material comprising:
a silicone base of a high temperature vulcanized silicone rubber;
a filler of melamine cyanurate; and
at least one inorganic filler which is different from melamine cyanurate, wherein total filler content is within a range of 40 parts (by weight) to 230 parts (by weight) per 100 parts (by weight) of silicone base; and wherein
(i) the melamine cyanurate is present within a range of 2 parts (by weight) to 40 parts (by weight) per 100 parts (by weight) of silicone base; and
(ii) the at least one inorganic filler is an electrical insulator.

19. A high temperature vulcanized silicon rubber according to claim 1, comprising:
further additives.

20. A high temperature vulcanized silicone rubber according to claim 1, wherein the melanine cyanurate is present within a range of 10 parts (by weight) to 20 parts (by weight) per 100 parts (by weight) of silicone base.

21. A high temperature vulcanized silicone rubber according to claim 6, wherein ATH and silica are used together, and a ratio of ATH:silica is 15:85 to 25:75, the content of melamine cyanurate is within a range of 15% to 30% by weight, calculated to a sum of the ATH and silica.

22. A high temperature vulcanized silicone rubber according to claim 1, wherein the inorganic filler comprises:
melamine cyanurate and silica, with a ratio of melamine cyanurate:silica being 20:80 to 5:95; and
ATH up to 5% by weight, calculated to a sum of silica and melamine cyanurate.

23. A high temperature vulcanized silicone rubber according to claim 1, wherein the inorganic filler is surface treated, with at least one of:
hexamethylsilazane and divinyltetramethyldisilazane.

24. A high temperature vulcanized silicone rubber according to claim 1, wherein the inorganic filler is surface treated with vinyltrimethoxysilan.

25. A high temperature vulcanized silicone rubber according to claim 1, comprising:
a hardenable liquid or pasteous silicone resin base composition formed as a mixture of organopolysiloxanes of the general formula (I):

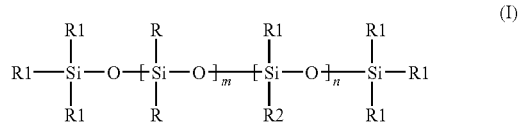

wherein
R (each independent of one other) is methyl, ethyl, propyl, 3,3,3-trifluoropropyl, monofluoromethyl, oder difluoromethyl; preferably methyl;
$R_1$ (each independent of one other) is R or $R_2$, or is —O-Alkyl($C_1$-$C_4$) or hydroxyl;
$R_2$ (each independent of one other) is R, or is hydrogen, or a residue of the formula: -(A)$_r$-CH=$CH_2$;
A is a residue —($CH_2$)$_s$—, wherein
s is a whole number 1;
r is zero or one;
m is a number within a range of 4'000 to 10'000;
n a number within the range of 2 to 20; and
wherein the groups —[Si(R)(R)O]— and —[Si($R_1$)($R_2$)O]— are ordered in an arbitrary sequence.

26. The method according to claim 16, wherein the temperature is within a range of 120° C. to 140° C.

* * * * *